United States Patent
Olarig et al.

(10) Patent No.: US 7,145,914 B2
(45) Date of Patent: Dec. 5, 2006

(54) SYSTEM AND METHOD FOR CONTROLLING DATA PATHS OF A NETWORK PROCESSOR SUBSYSTEM

(75) Inventors: Sompong Paul Olarig, Pleasanton, CA (US); Mark Lyndon Oelke, Spring, TX (US); John E. Jenne, Cedar Park, TX (US)

(73) Assignee: Maxxan Systems, Incorporated, San Jose, CA (US)

( * ) Notice: Subject to any disclaimer, the term of this patent is extended or adjusted under 35 U.S.C. 154(b) by 951 days.

(21) Appl. No.: 10/039,190

(22) Filed: Dec. 31, 2001

(65) Prior Publication Data

US 2003/0126297 A1    Jul. 3, 2003

(51) Int. Cl.
*H04L 12/56* (2006.01)
(52) U.S. Cl. .................................... 370/413
(58) Field of Classification Search ............. None
See application file for complete search history.

(56) References Cited

U.S. PATENT DOCUMENTS

| | | | |
|---|---|---|---|
| 4,755,930 A | 7/1988 | Wilson, Jr. et al. ......... | 364/200 |
| 5,140,682 A | 8/1992 | Okura et al. ............... | 395/425 |
| 5,247,649 A | 9/1993 | Bandoh ...................... | 395/425 |
| 5,530,832 A | 6/1996 | So et al. .................... | 395/449 |
| 5,602,841 A * | 2/1997 | Lebizay et al. ............. | 370/413 |
| 5,611,049 A | 3/1997 | Pitts ....................... | 395/200.09 |
| 5,699,548 A | 12/1997 | Choudhury et al. ........ | 395/469 |
| 5,778,429 A | 7/1998 | Sukegawa et al. .......... | 711/129 |
| 5,835,756 A | 11/1998 | Caccavale .................. | 395/601 |
| 5,835,943 A | 11/1998 | Yohe et al. ................. | 711/118 |
| 5,845,280 A | 12/1998 | Treadwell, III et al. ....... | 707/8 |
| 5,845,324 A | 12/1998 | White et al. ................ | 711/128 |
| 5,852,717 A | 12/1998 | Bhide et al. ........... | 395/200.33 |
| 5,864,854 A | 1/1999 | Boyle .......................... | 707/10 |
| 5,873,100 A | 2/1999 | Adams et al. ............... | 707/204 |
| 5,878,218 A | 3/1999 | Maddalozzo, Jr. et al. ..................... | 395/200.43 |
| 5,881,229 A | 3/1999 | Singh et al. ........... | 395/200.33 |
| 5,918,224 A | 6/1999 | Percival ....................... | 711/119 |
| 5,933,849 A | 8/1999 | Srbljic et al. ............... | 711/118 |
| 5,944,780 A | 8/1999 | Chase et al. ................ | 709/201 |
| 5,944,789 A | 8/1999 | Tzelnic et al. .............. | 709/214 |
| 5,978,841 A | 11/1999 | Berger ........................ | 709/217 |
| 5,978,951 A | 11/1999 | Lawler et al. .............. | 714/758 |
| 5,987,223 A | 11/1999 | Narukawa et al. .......... | 395/109 |
| 5,991,810 A | 11/1999 | Shapiro et al. ............. | 709/229 |
| 6,041,058 A | 3/2000 | Flanders et al. ............ | 370/401 |
| 6,044,406 A | 3/2000 | Barkey et al. .............. | 709/235 |
| 6,081,883 A | 6/2000 | Popelka et al. ............... | 712/28 |
| 6,085,234 A | 7/2000 | Pitts et al. .................. | 709/217 |

(Continued)

OTHER PUBLICATIONS

U.S. Appl. No. 10/117,418 entitled "System and Method for Linking a Plurality of Network Switches," filed Apr. 5, 2002, by Ram Iyer et al.

(Continued)

*Primary Examiner*—Chau Nguyen
*Assistant Examiner*—Jordan Hamann
(74) *Attorney, Agent, or Firm*—Baker Botts L.L.P.

(57) ABSTRACT

A heterogeneous and scalable bridge capable of translating a plurality of network protocols is adapted for coupling to a network switch fabric. The bridge uses at least one egress buffer interface and can perform port aggregation and bandwidth matching for various different port standards. The bridge is adapted for both networking and storage area networking protocols. A control unit is implemented with the bridge is able to identify control and flow information from different protocols and adapt them to the respective interface to which they are to be transmitted.

31 Claims, 8 Drawing Sheets

U.S. PATENT DOCUMENTS

| | | | |
|---|---|---|---|
| 6,098,096 A | 8/2000 | Tsirigotis et al. | 709/213 |
| 6,128,306 A * | 10/2000 | Simpson et al. | 370/412 |
| 6,138,209 A | 10/2000 | Krolak et al. | 711/128 |
| 6,147,976 A | 11/2000 | Shand et al. | 370/254 |
| 6,243,358 B1 | 6/2001 | Monin | 370/229 |
| 6,289,386 B1 | 9/2001 | Vangemert | 709/232 |
| 6,400,730 B1 | 6/2002 | Latif et al. | 370/466 |
| 6,532,501 B1 | 3/2003 | McCracken | 710/52 |
| 6,594,701 B1 | 7/2003 | Forin | 709/232 |
| 6,615,271 B1 | 9/2003 | Lauck et al. | 709/232 |
| 6,657,962 B1 | 12/2003 | Barri et al. | 370/235 |
| 6,687,247 B1 * | 2/2004 | Wilford et al. | 370/392 |
| 6,731,644 B1 * | 5/2004 | Epps et al. | 370/412 |
| 6,735,174 B1 | 5/2004 | Hefty et al. | 370/235 |
| 6,747,949 B1 | 6/2004 | Futral | 370/231 |
| 6,757,791 B1 * | 6/2004 | O'Grady et al. | 711/154 |
| 6,758,241 B1 | 7/2004 | Pfund et al. | 137/596 |
| 6,762,995 B1 * | 7/2004 | Drummond-Murray et al. | 370/229 |
| 6,765,871 B1 | 7/2004 | Knoebel et al. | 370/229 |
| 6,765,919 B1 | 7/2004 | Banks et al. | 370/401 |
| 6,792,507 B1 | 9/2004 | Chiou et al. | 711/119 |
| 2001/0037435 A1 | 11/2001 | Van Doren | 711/153 |
| 2001/0043564 A1 | 11/2001 | Bloch et al. | 370/230 |
| 2002/0004842 A1 | 1/2002 | Ghose et al. | 709/235 |
| 2002/0010790 A1 | 1/2002 | Ellis et al. | 709/238 |
| 2002/0012344 A1 | 1/2002 | Johnson et al. | 370/389 |
| 2002/0186703 A1 | 12/2002 | West et al. | 370/413 |
| 2002/0188786 A1 | 12/2002 | Barrow et al. | 710/300 |
| 2003/0012204 A1 | 1/2003 | Czeiger et al. | 370/401 |
| 2003/0074449 A1 | 4/2003 | Smith et al. | 709/226 |
| 2003/0084219 A1 | 5/2003 | Yao et al. | 710/300 |
| 2003/0126223 A1 | 7/2003 | Jenne et al. | 709/212 |
| 2003/0163555 A1 | 8/2003 | Battou et al. | 709/223 |
| 2003/0195956 A1 | 10/2003 | Bramhall et al. | 709/223 |
| 2005/0018619 A1 | 1/2005 | Banks et al. | 370/254 |

OTHER PUBLICATIONS

U.S. Appl. No. 10/117,040 entitled "System and Method for Expansion of Computer Network Switching System Without Disruption Thereof," filed Apr. 5, 2002, by Mark Oelke et al.

U.S. Appl. No. 10/117,266 entitled "System and Method for Guaranteed Link Layer Flow Control," filed Apr. 5, 2002, by Hani Ajus et al.

U.S. Appl. No. 10/117,638 entitled "Fibre Channel Implementation Using Network Processors," filed Apr. 5, 2002 by Yao Hawkins et al.

U.S. Appl. No. 10/117,290 entitled "Method and System for Reduced Distributed Event Handling in a Network Environment," filed Apr. 5, 2002 by Huang Ruotao et al.

* cited by examiner

SYSTEM AND METHOD FOR CONTROLLING DATA PATHS OF A NETWORK PROCESSOR SUBSYSTEM

CROSS-REFERENCE TO RELATED APPLICATIONS

This application is related to U.S. patent application Ser. No. 09/738,960, titled "Caching System and Method for a Network Storage System" by Lin-Sheng Chiou, Mike Witkowski, Hawkins Yao, Cheh-Suei Yang, and Sompong Paul Olarig, which was filed on Dec. 14, 2000, now U.S. Pat. No. 6,792,507, and which is incorporated herein by reference in its entirety for all purposes; U.S. patent application Ser. No. 10/015,047, titled "System, Apparatus and Method for Address Forwarding for a Computer Network" by Hawkins Yao, Cheh-Suei Yang, Richard Gunlock, Michael L. Witkowski, and Sompong Paul Olarig, which was filed on Oct. 26, 2001 and which is incorporated herein by reference in its entirety for all purposes; U.S. patent application Ser. No. 10/039,189, titled "XON/XOFF Flow Control for Computer Network" by Hawkins Yao, John B. Jenne, and Mark Lyndon Oelke, which is being filed concurrently on Dec. 31, 2001, and which is incorporated herein by reference in its entirety for all purposes; and U.S. patent application Ser. No. 10/039,184, titled "Buffer to Buffer Credit Flow Control for Computer Network" by John B. Jenne, Mark Lyndon Oelke and Sompong Paul Olarig, which is being filed concurrently on Dec. 31, 2001, and which is incorporated herein by reference in its entirety for all purposes.

FIELD OF THE INVENTION

The present invention is related to computer networks. More specifically, the present invention is related to a system and method for bridging a plurality of network processor interfaces with a switch fabric interface.

BACKGROUND OF THE INVENTION TECHNOLOGY

Current Storage Area Networks (SANs) are designed to carry block storage traffic over predominantly Fibre Channel standard medium and protocols. There exist several proposals for moving block storage traffic over SANs built on other networking technology such as Gigabit Ethernet, asynchronous transfer mode (ATM)/SONET, InfiniBand or other networking medium and protocols. A bridge is sometimes used to couple a network processor with a switch fabric interface. For example, a switch fabric interface is standardized by the Common Switch Interface Consortium (CSIX) and known as a CSIX switch fabric. There are many other proprietary interfaces. For example, SPI-4 is another standard. The network processors, however, often have a different interface. These bridges or translation devices, therefore, make the necessary translations between these two protocols/mediums in order to serve the clients (host computers/servers and storage target devices). Existing bridges usually allow the connection of a single network processor interface to one switch fabric interface. Such bridges may provide some functionality with respect to ingress/egress handling, congestion management, protocol translation, and Quality of Service (QoS)-based thresholding.

It is difficult to build heterogeneous SANs that are scalable using these bridges/translation devices because the bridges/translation devices usually become the bottleneck protocol environment requires the installation of complex hardware or logic on these bridges/translation devices.

SUMMARY OF THE INVENTION

The present invention overcomes the above-identified problems as well as other shortcomings and deficiencies of existing technologies by providing an apparatus, system and method for building heterogeneous and scalable bridges/translation devices in combination with a network switch fabric system.

The present invention is directed to a network system comprising a plurality of network processor interfaces for transmitting and receiving data cell sequences, a switch fabric interface; an ingress path providing a plurality of ingress queues between the plurality of network processor interfaces and the switch fabric interface combining the transmitted data calls of the network processors to a single data cell sequence, an egress path providing a plurality of egress queues and a memory controller between the plurality of the switch fabric interface and network processor interfaces for distributing data cell sequences from a received data cell sequence to the respective network processor interfaces. The egress path may comprise a first egress path handling control signals and a second egress path handling data signals. Each network processor interface may comprise a receiving interface and a transmitting interface. The ingress queues may each have an input and an output, each ingress queue input being coupled with a respective transmitting network processor interface, and the ingress path may further comprise a multiplexer coupled with the outputs of the plurality of ingress queues and the switch fabric interface. The network system may further comprise an ingress output queue coupled between the multiplexer and the switch fabric interface. The egress path may comprise a demultiplexer coupled with the switch fabric interface and the plurality of egress queues. The memory controller may comprise a memory interface and a egress path routing switch routing the received cells through a memory coupled with the memory controller or directly to the network processor interfaces if no memory is coupled with the memory controller. The network system may further comprise a first set of egress queues coupled between the demultiplexer and a memory multiplexer coupled with a memory controller input, a memory demultiplexer coupled with a memory controller output, a second set of egress queues coupled between the memory demultiplexer and the network processor interfaces. The egress path may comprise a first egress path handling control signals and a second egress path handling data signals, wherein the first egress path may comprise a third set of egress queues coupled between the demultiplexer and the network processors and the second egress path may comprise the first and second egress queues, and wherein a plurality of output multiplexers may be coupled between the network processors and the first and second egress paths. The first and second set of egress queues may comprise two queues associated with each network processor interface. The memory interface may be configured to couple with an error correcting memory. The memory interface may be configured to couple with a DDR SRAM. The memory interface may be configured to couple with a QDR ECC SRAM. The error correcting memory may be an inband memory. Each queue may comprise an associated watermark register. The network system may further comprise a control unit for controlling the ingress and egress queues. The network system may further comprise an a host-subsystem interface coupled with the control unit. The network processor interface may be provided on a line card having five network processor ports. The network processor interface may be provided on a line card having a plurality of five network processor ports. The switch fabric interface may have a higher bandwidth than one of the plurality of network processor interfaces and the number of network processors interfaces may be adapted to approximately match the bandwidth of the bandwidth of the switch fabric interface.

The present invention is also directed to a method of controlling the ingress and egress data paths of a network processor interface system, the method comprising the steps of: providing a plurality of network processor interfaces for transmitting and receiving data cell sequences, providing a switch fabric interface; providing an ingress path having a plurality of ingress queues between the plurality of network processor interfaces and the switch fabric interface combining the transmitted data calls of the network processors to a single data cell sequence; and providing an egress path having a plurality of egress queues and a memory controller between the plurality of the switch fabric interface and network processor interfaces for distributing data cell sequences from a received data cell sequence to the respective network processor interfaces. The method may further comprise the steps of buffering transmitted data cells in the ingress queues, combining the content of the ingress queues and buffering the combined data cells in an ingress output queue. The method may further comprise the step of splitting the egress path in a first path handling control data cells and a second path handling data cells. The method may further comprise the step of: if a memory is coupled to the memory interface, storing received data cells in the memory, otherwise moving the received data cells directly to the respective network processor interface. The method may further comprise the steps of providing at least two egress queues for each network processor interface, and selecting which queue is coupled with the associated network processor interface. The method may further comprise the steps of generating a control data cell by the memory controller, and routing the generated control cell through the first egress path. The method may further comprise the steps of monitoring the filling level of the queues and generating control signals according to the filling level. The method may further comprise the step of discarding data cells according to their status if the filling level is reached within a queue. The method may further comprise the step of distributing data cells according to a priority scheme included in the data cells. The method may further comprise the step of distributing data cells according to a Quality of Service scheme included in the data cells. Storage area network and networking protocols may be processed. The switch fabric interface may have a higher bandwidth than one of the plurality of network processor interfaces, and the method may further comprise the step of providing a number of network processor interfaces adapted for combining the bandwidth of the network processors to approximately match the bandwidth of the switch fabric interface. The bandwidth of the switch fabric interface may be lower than the combined bandwidth of the network processor interfaces.

Other and further features and advantages will be apparent from the following description of exemplary embodiments of the invention, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings, wherein.

Figure 1:
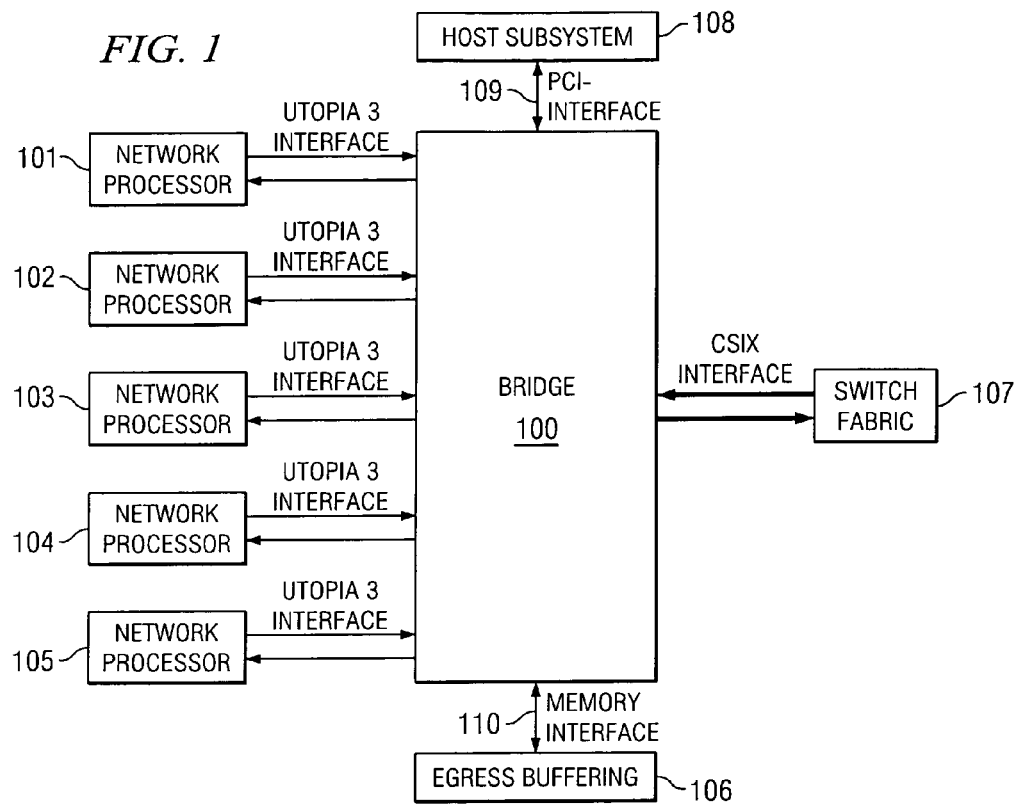
FIG. 1 is a schematic representation of a system including a bridge according to the present invention.

While the present invention is susceptible to various modifications and alternative forms, specific exemplary embodiments thereof have been shown by way of example in the drawings and are herein described in detail. It should be understood, however, that the description herein of specific exemplary embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The present invention relates to a system, apparatus and method for bridging a plurality of network processors with at least one switch fabric interface. In addition, a host subsystem interface can be implemented. The bridge uses at least one egress buffer interface and can perform port aggregation and bandwidth matching. The present invention is able to handle both networking and storage area networking protocols through its unique structure. The control unit implemented is able to identify control and flow information from different protocols and adapt them to the respective interface to which they are transmitted.

FIG. 1 schematically illustrates the different interfaces of a bridge according to an exemplary embodiment of the present invention. The bridge is generally designated by numeral 100. It comprises a plurality of network processor interfaces, for example, according to the UTOPIA 3 specification developed by the ATM. In the present embodiment five network processors 101, 102, 103, 104, and 105 may be coupled through these interfaces. These interfaces for the network processors 101, 102, 103, 104, and 105 may have, for example but be limited to, a bit width of 32 and an operating speed of 100 MHz. A network processor interface according to the Utopia 3 standard is a point-to-point interface and is uni-directional. Thus, there is a 32-bit Tx and a 32-bit Rx interface between each network processor (101, 102, 103, 104, and 105) and the bridge 100. Furthermore, a parity bit can be provided, covering, for example but not limited to, 32 bits. In a Utopia 3 interface, this parity bit is defined by the Utopia 3 specification. Thus, each network processor 101, 102, 103, 104, and 105 generates one parity bit for the ingress path and one parity bit will be received and verified on the 32 Bit network processor egress interface.

A Common Switch Interface Consortium (CSIX) switch fabric interface couples the bridge with a switch fabric 107. Of course, any other type of switch fabric interface can be implemented and is contemplated herein. Thus, the present invention is not limited to only CSIX interfaces. This CSIX interface comprises, for example but is not limited to, a bus width of 64 bits and operates at a speed of 200 MHz. It can also be provided with a parity function. To this end, two parity bits are provided for each 32 bits, e.g., two parity bits are generated for the CSIX ingress interface and two parity bits are generated for the CSIX egress interface. Furthermore, a host subsystem 108 may be coupled with the bridge through a bus 109. Here a single parity bit covering 16 bits may be used. Thus, one parity bit will be used for transmitting and one for receiving by the subsystem interface. As no high speed data transmission is necessary for this interface, this bus 109 can be implemented, e.g., as a standard PCI bus having a bit width of 16 bits and an operating speed of 33 MHz or a proprietary bus used for connecting the bridge to the host subsystem and the like. If a proprietary bus is used, this bus can have, for example, a multiplexed address/data bus such as a split transaction bus. Any other suitable bus can be used to interface the bridge with a host subsystem and is contemplated herein.

Finally, a special interface for an egress buffer memory 106 is provided. This interface may have, for example but not limited to, a bus width of 128 bits operating at a speed of 100 MHz. The error correction system for this interface will be explained in more detail below. A preferred configuration includes external memory 106 coupled through the memory bus 110. This memory 106 may be used to handle the egress buffering operations. In one exemplary embodiment, the 128 bit wide interface may be bidirectional or in another exemplary embodiment it may comprise a 64 bit read and a 64 bit write memory interface with 8 bits of parity for each direction. Such a wide interface is desired so as to match the write bandwidth requirement of the one switch fabric interface and the read bandwidth requirement of the five network processor interfaces. The size of the external memory 106 depends on the amount of traffic as will be explained in more detail below. Furthermore, different types of memory having different data widths may be supported to accommodate all kinds of memories, e.g., high speed memory devices, such as quad data rate (QDR) SRAM memories and the like.

Figure 2:
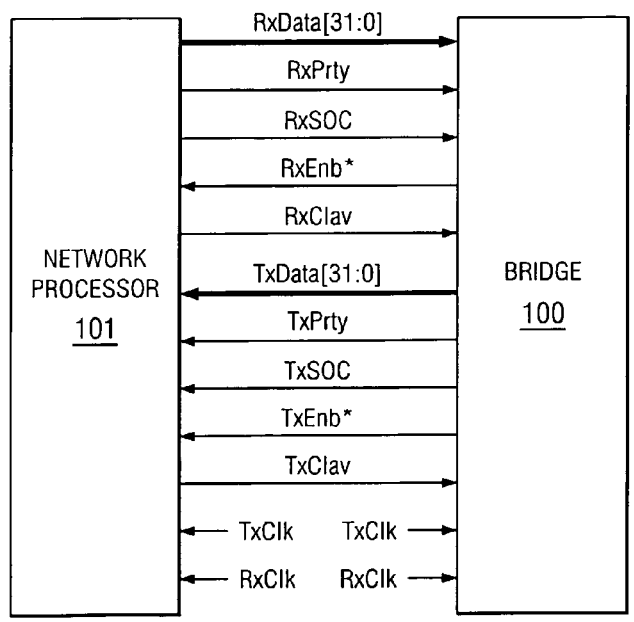
FIG. 2 is a more detailed representation of the interface between the bridge and a network processor.

FIG. 2 depicts one of the network processor interfaces in greater detail. A network processor 101 is coupled through this interface with a split bus for receiving and transmitting data. The receiving bus comprises 32 bits of data, RxData, and four different control signals: 1) RxPrty for the receive data bus odd parity, 2) RxSOC for the receive start of a cell, 3) RxEnb for the receive enabling, and 4) RxClav for the cell available control. The transmitting bus comprises 32 bits of data, TxData, and 4 different control signals: 1) TxPrty for the transmit data bus odd parity, 2) TxSOC for the transmit start of a cell, 3) TxEnb for the transmit enabling, and 4) TxClav for the cell buffer available control. Furthermore, separate clock signal lines TxClk and RxClk for the transmitting and the receiving bus are provided. Unlike the switch fabric bus, this bus does not send idle cells and has an out of band flow control. The bridge, according to the present invention, is able to interpret flow and control information for all kinds of storage area network protocols and network protocols. It distributes data cells and control cells to their destined ports, and also handles additional functions such as Quality of Service or discarding functions. These informations are usually included in specific bits of control bytes within the data and/or control cells. Depending on the aggregate bandwidth of the ingress/egress ports the system handles the data flow of the control and data cells to optimize speed and functionality of the entire system. For example, many ports may have a limited bandwidth whereas the switch fabric bandwidth is much larger in comparison. The system according to the invention, thus, increases the port count I/O connectivity and reduces the cost per port of networks such as a SAN product by combining a plurality of network processor interfaces with one high speed switch fabric interface.

The bridge 100 comprises all necessary circuits to couple the respective network processors 101, 102, 103, 104, and 105 with the switch fabric 107 and to adapt the respective data transfer protocols, meet all requirements to communicate with the switch fabric 107 including link level flow control and idle cell generation.

Figure 3A:
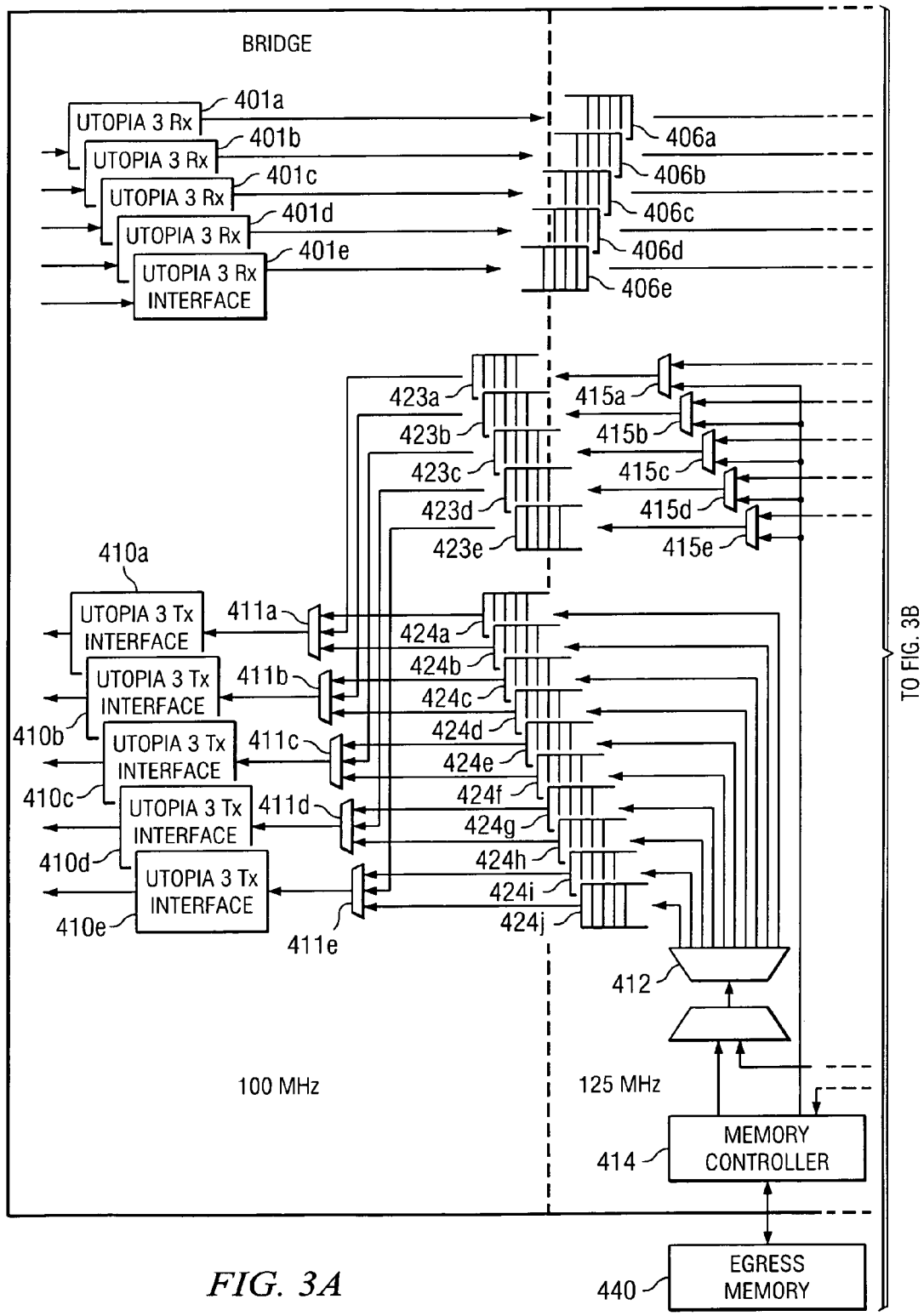
FIG. 3 a more detailed schematic block diagram of a bridge according to the present invention.
Figure 3B:
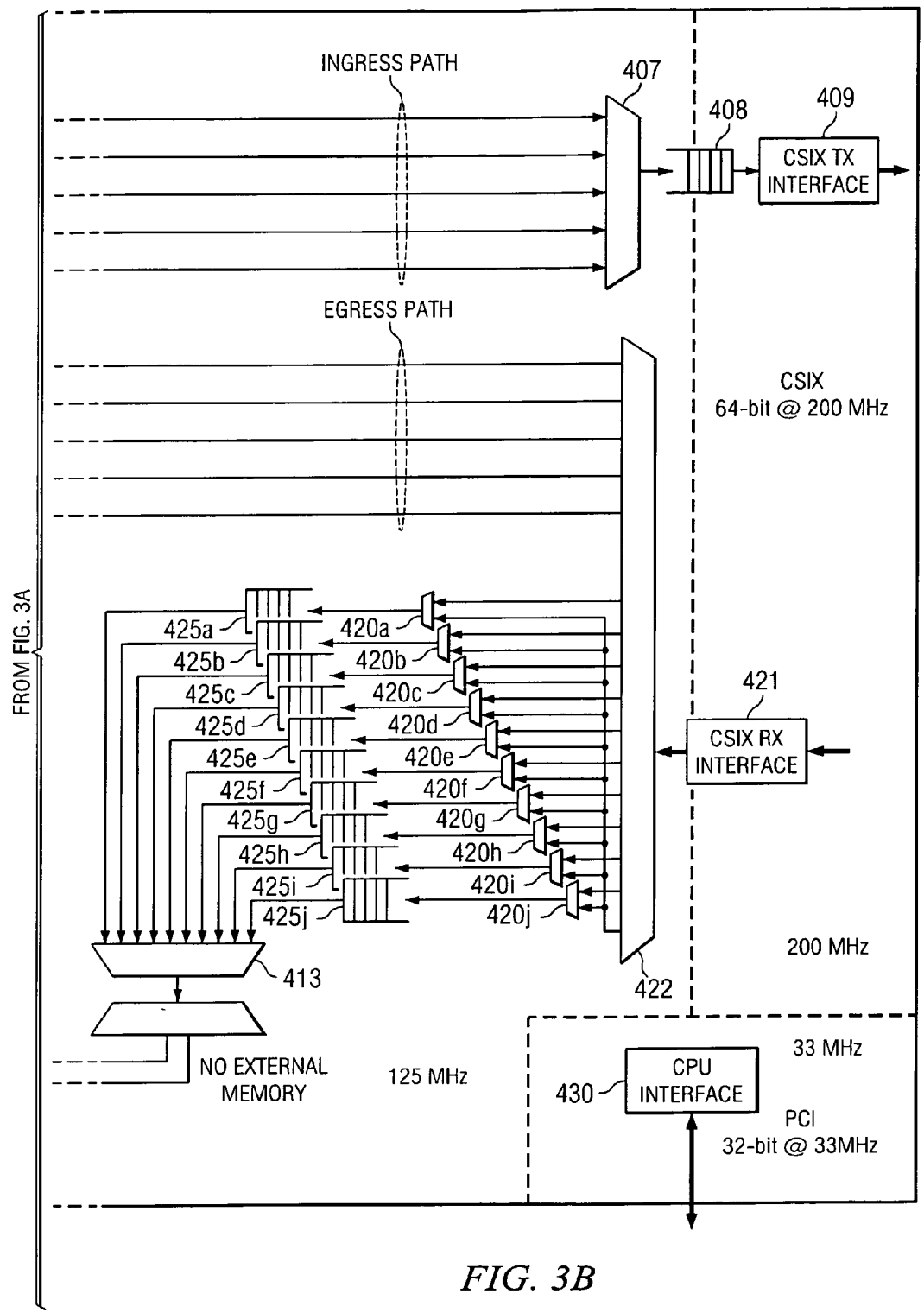

FIG. 3 illustrates a more detailed block diagram of the bridge 100. The ingress path, providing communication from the network processors 101, 102, 103, 104, and 105 to the switch fabric 107 provides, for example but not limited to, five unidirectional interfaces 401*a–e*. Thus, a bridge arrangement can serve five network processors. Thus, it is easy to extend the system on a base-10 rather than a base-2 which is preferable by system users. For example, a line card can comprise 10 ports. Therefore, a plurality of line cards will support a plurality of 10 ports which is highly preferred over multiples of 2.

Numeral 406*a–e* indicates the inbound data queues for each path. These queues 406*a–e* are coupled through a multiplexer 407 with a single queue 408 which is coupled with CSIX Tx interface 409. An arbitrator (not shown) is used to control the multiplexer. It arbitrates among the five inbound queues 406*a–e* in a round robin fashion. Each queue 406*a–e* and 408 can be implemented with a weighed priority scheme that will be described later and which may be monitored by the bridge system. In another exemplary embodiment, so-called watermark registers can be used to indicate the filling status of a queue. The ingress path also handles width and frequency matching between the interfaces as the data width of the CSIX Tx interface 409 is twice as wide and twice as fast as that of each network processor interface 401*a–e*. The depth of the queues 406*a–e* can be configured depending on the overall system performance. The queues 406*a–e* and 408 can have, for example but not limited to, a depth of 10 cells for the ingress outbound queue to provide sufficient depth, thus minimizing unnecessary back pressure via Link-Level Flow Control caused by temporary over-subscription. This situation can take place in the unlikely event when all network processors operate at full speed. In this case the outbound speed of 64 bit width @ 200 MHz (equivalent to 32 bit width @ 400 MHz) will be overloaded by the five network processors (equivalent to 32 bit width @ 500 MHz). However, normally the network processor throughput is usually around 1000 MB/s for ten 1 Gbps fibre channels. As the 64-bit @ 200 MHz CSIX interface's throughput is actually 1280 MB/s, in particular after removing overhead, it is unlikely that any bandwidth problem will occur.

The bridge 100 is also adapting the different data cell sizes of the incoming and outgoing data cells, thereby matching the respective specifications. The CSIX interface, for example but not limited to, transmits and receives 80-byte fixed length data cells. However, the network processor, for example, according to the UTOPIA 3 specification, sends and receives 68-byte data cells. Thus, the bridge will generate and append a 6-byte CSIX header and a 6-byte CSIX trailer in the ingress direction. The network processor can allow the UTOPIA 3 cell size to be configured. Other configurations are therefore possible and can be implemented and are contemplated herein.

The egress path provides two different flow paths. CSIX Rx interface 421 couples the bridge with the switch fabric. A de-multiplexer 422 distributes the data cells to either the first path consisting of five direct egress paths or the second path consisting of 10 egress paths including a memory controller 414. The first path may be used exclusively for control cells. Control cells are used to implement network processor to network processor control messages, such as port level flow control. Control cells have the highest priority and are queued separately from the other so-called unicast or multicast cells. The CSIX cell header will not indicate control cells. The bridge will have to look at a field in the embedded UTOPIA 3 cell header. When a control cell is received on the interface 421 it is queued in a special control inbound queue 423a–e through multiplexers 415a–e. There are five control outbound queues 423a–e, one for each UTOPIA 3 interface 410a–e. Multiplexers 415a–e are provided between de-multiplexer 422 and the input of queues 423a–e. Furthermore, first inputs of five multiplexers 411a–e are coupled with the outputs of queues 423a–e. The outputs of multiplexers 411a–e are coupled with the transmitter interfaces 410a–e for the network processors 101, 102, 103, 104, and 105.

When no external memory is present, control cells are moved from the control inbound queue and broadcast to all five control outbound queues 423a–e. If external memory 440 is present, control messages can be generated by the memory controller 414 indicating egress buffer congestion. An arbitrator fairly selects through multiplexers 415a–e control cells from the control inbound queue and from the memory controller 414. The UTOPIA 3 interface 410a–e has arbiters controlling multiplexers 411a–e that give priority to control cells over unicast and multicast cells. Unicast messages are messages that are destined for a single target, whereas multicast messages are messages that are destined for multiple targets. The control unit distributes these messages by means of the multiplexers. To this end, multicast messages are copied into all destination queues. Thus, unicast cells are cells that arrive at de-multiplexer 422 and, based on the label contents in the cell header, are queued to a single queue 425a–j and, hence, a single network processor. Multicast cells are cells that arrive at de-multiplexer 422 and, based on the label contents in the cell header, are queued to one or more queues 425a–j and, hence, more than one network processor. Since control cells have the highest priority and arrive infrequently compared to normal data cells, the queuing requirements are minimal. A control outbound queue depth of 3 cells for queue 423a–e per UTOPIA 3 interface 410a–e may therefore be sufficient. However, depending on the design, each queue can have more cells, for example, 64 cells.

The second path comprises ten multiplexers 420a–j coupling the respective outputs of de-multiplexer 422 with the unicast and multicast queues 425a–j. Multiplexers 420a–j are used to select between unicast and multicast cells to be queued to each of the queues 425a–j. Further downstream the unicast and multicast queues 425a–j are coupled with a multiplexer 413. Multiplexer 413 couples one of the selected queues 425a–j with the input of a memory controller 414 when external memory is present. The input of multiplexer 412 is coupled with the output of memory controller 414. When the bridge is configured for no-external memory, multiplexer 413 couples one of the selected queues 425a–j directly to the input of a multiplexer 412. Multiplexer 412 provides ten output paths which connect to another set of ten queues 424a–j. Multiplexers 411a–e, each provides two more inputs. Thus, each multiplexer 411a–e couples with two of the queues 424a–j thereby coupling two queues with each interface 410a–e.

The bridge receives unicast cells from a single CSIX Rx interface 421. Unicast cells are queued to one of ten inbound queues 425a–j depending on its destination. A field in the UTOPIA 3 cell header indicates one of the ten egress ports, which is used to select the corresponding egress inbound queue. The bridge supports an external memory mode to provide greater egress buffering capacity. When no external memory 440 is present, cells are moved from one of the ten inbound queues 425a–j to one of the ten corresponding outbound queues 424a–j as entries come available. If external memory 440 is present, the cells will preferably be moved to the corresponding egress buffer in external memory 440. The cells will then be moved from external memory 440 to the outbound queues 424a–j as entries become available in the corresponding outbound queues 424a–j.

With ten outbound queues and five UTOPIA 3 Tx interfaces 410a–e, two outbound queues map to each Tx interface 410a–e. Each UTOPIA 3 Tx interface 410a–e has an arbitration control unit controlling multiplexers 411a–e that gives the highest priority to flow control cells and then arbitrates fairly between each of its two outbound queues 424a–j with unicast cells.

The bridge receives multicast cells from a single CSIX Rx interface 421. Upon receiving a multicast cell, the bridge uses the multicast label in the UTOPIA 3 cell header to perform a lookup in the multicast table (not shown in FIG. 3). The results of the table lookup indicate which of the ten ports should receive a copy of the multicast cell. The bridge will queue a copy of the multicast cell to the inbound queues 425a–j that correspond to the multicast cell's port destinations. Unicast and multicast cells share the same queuing structures and data paths.

External egress buffering is necessary because of the bandwidth difference between the switch fabric interface 421 and network processor TX interfaces 410a–e, the long Port-Level Flow Control latencies, and the requirement that Fibre Channel cells cannot be discarded. Performance simulations have shown that significant egress buffering is needed to minimize end-to-end cell latencies and to avoid head-of-line blocking. The egress buffer 440 is divided statically into ten buffers, one for each egress port, to eliminate head-of-line blocking. Each egress buffer is managed as an independent wrap-around FIFO. The memory controller will store the current head and tail for each egress buffer.

In a further embodiment of the present invention, the bridge is coupled to a computer system or server via CPU interface 430. The CPU interface 430 may be coupled to a computer system or server via a bus, such as a PCI bus or other means known in the art.

Figure 4:
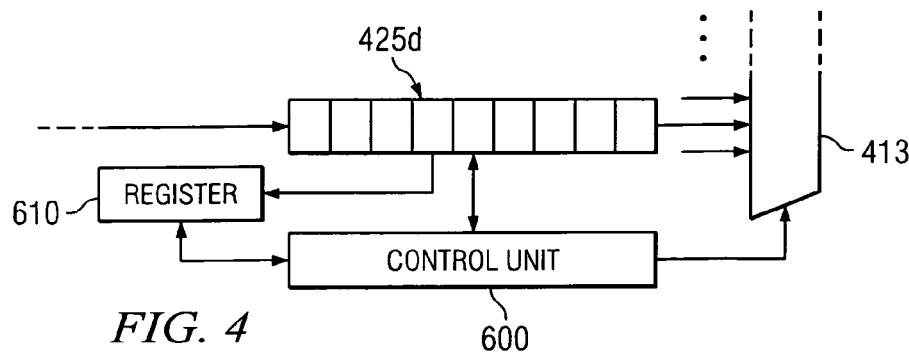
FIG. 4 is a schematic block diagram of a single queue and associated control circuitry.

FIG. 4 illustrates a block diagram with a partial view of multiplexer 413, and one of the queues and associated control circuitry used in the bridge system according to the exemplary embodiment of the present invention. As an example, only one egress queue, namely egress queue 425d is depicted in FIG. 4. The dotted lines in FIG. 4 indicate that more queues and respective registers may be coupled with the multiplexer 413. A control unit 600 coupled with queue 425d is provided to generate all necessary control and arbitration signals necessary to handle the data flow within the bridge 100. Control unit 600 is coupled with multiplexer 413 and generates control signals to select the egress data path by controlling the respective multiplexers. A watermark register 610 is coupled with queue 425*d* and with control unit 600. Watermark register 610 can store a value representing the filling level of queue 425*d* or can be a single bit indicating whether a predefined filling level has been reached, for example, by comparing a input and a output pointer. The sensitivity of the watermark registers can further be adjustable. All other queues can be implemented in a similar way. Register 610 may be either part of the queue or may be integrated within the control unit. Separate control units for the ingress and the egress paths may be provided or a single general control unit may control all functions of the queues and multiplexers. Furthermore, the queues, multiplexers, control units, and other necessary circuitry may be implemented within a single ASIC or around a microcontroller. The control unit further may be coupled with the host-subsystem interface. Thus, the host-subsystem may monitor the bridge activity, adjust the sensitivity of the watermark registers according to the data flow and perform other necessary administrative operations.

The bridge may be implemented to be able to support two egress buffering modes: 1) with external memory and 2) without external memory. The normal configuration will include external memory. External memory might be needed due to the egress buffering requirements. The external memory interface may be, for example but not limited to, a 128-bit wide quad data rate (QDR) SRAM interface operating at 100 MHz. This wide interface is needed to match the write bandwidth requirement of one CSIX switch fabric interface 421 and the read bandwidth requirement of five TX interfaces 410*a–e*. For example, such a memory interface can provide 4 MB of external memory. The bridge can support up to 8 MB of egress buffering. However, the memory size can be easily expanded by providing more address lines controlled by the bridge to take advantage of future QDR SRAM densities.

The following TABLE 1 lists preferred memory configurations.

TABLE 1

| Buffer Size (MB) | QDR SRAM Configuration | Bus width (bits) | Speed (MHz) | Bandwidth (Gbps) | Quantity |
|---|---|---|---|---|---|
| 4 | 9 Mb (512 K × 18) | 128 DDR | 100 | 25.6 | 4 |
| 8 | 18 Mb (1 M × 18) | | | | 4 |

The 80-byte (640-bit) CSIX cell preferably is stored in external memory. A 128-bit memory interface may be required to meet capacity and bandwidth requirements as well as maximize the efficiency of the memory interface.

Figure 5:
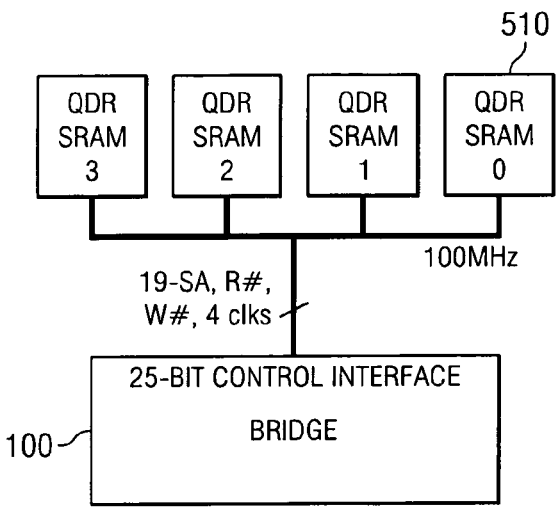
FIGS. 5 and 6 are schematic block diagrams of an exemplary embodiment of the egress memory interface.
Figure 6:
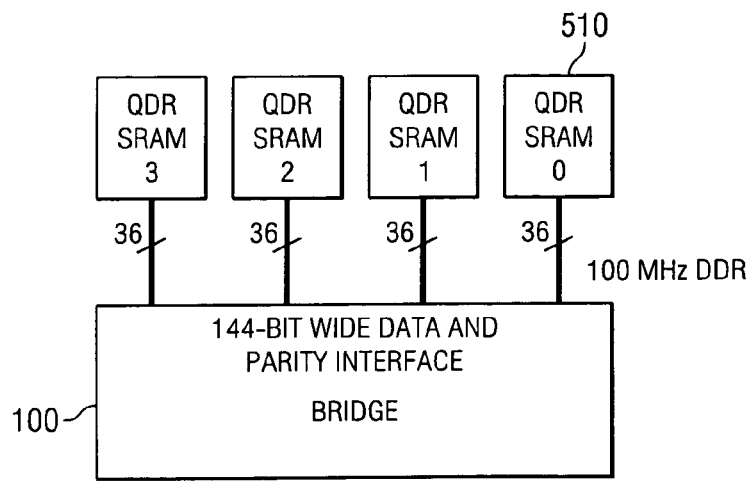

If the bridge is designed to be part of a robust system, the external memory interface can be equipped with error protection, such as parity or error correction code. Thus, to provide a highly reliable memory, for example, an error correcting code (ECC) memory can be used with the bridge according to the present invention. A first type of such a memory uses, for example but is not limited to, 1 check bit which is required to protect 8-bits of data. For a 128-bit memory interface, a total of 16 additional signals may be needed to provide memory protection for 128-bit of data resulting in a 144 bit wide data bus. FIG. 5 depicts a possible arrangement including four QDR SRAM modules 510 (e.g., QDR SRAM 3, QDR SRAM 2, QDR SRAM 1, QDR SRAM 0 and the coupling of, for example but is not limited to, 25 command, clock and address lines whereas FIG. 6 depicts the coupling of the 144 data lines for the same arrangement. The coupling of the command lines may include optional registers as illustrated in FIG. 5. These registers are used to latch data from DRAM devices. Typically, they are needed when the system operates at high speed data rate.

Figure 7:
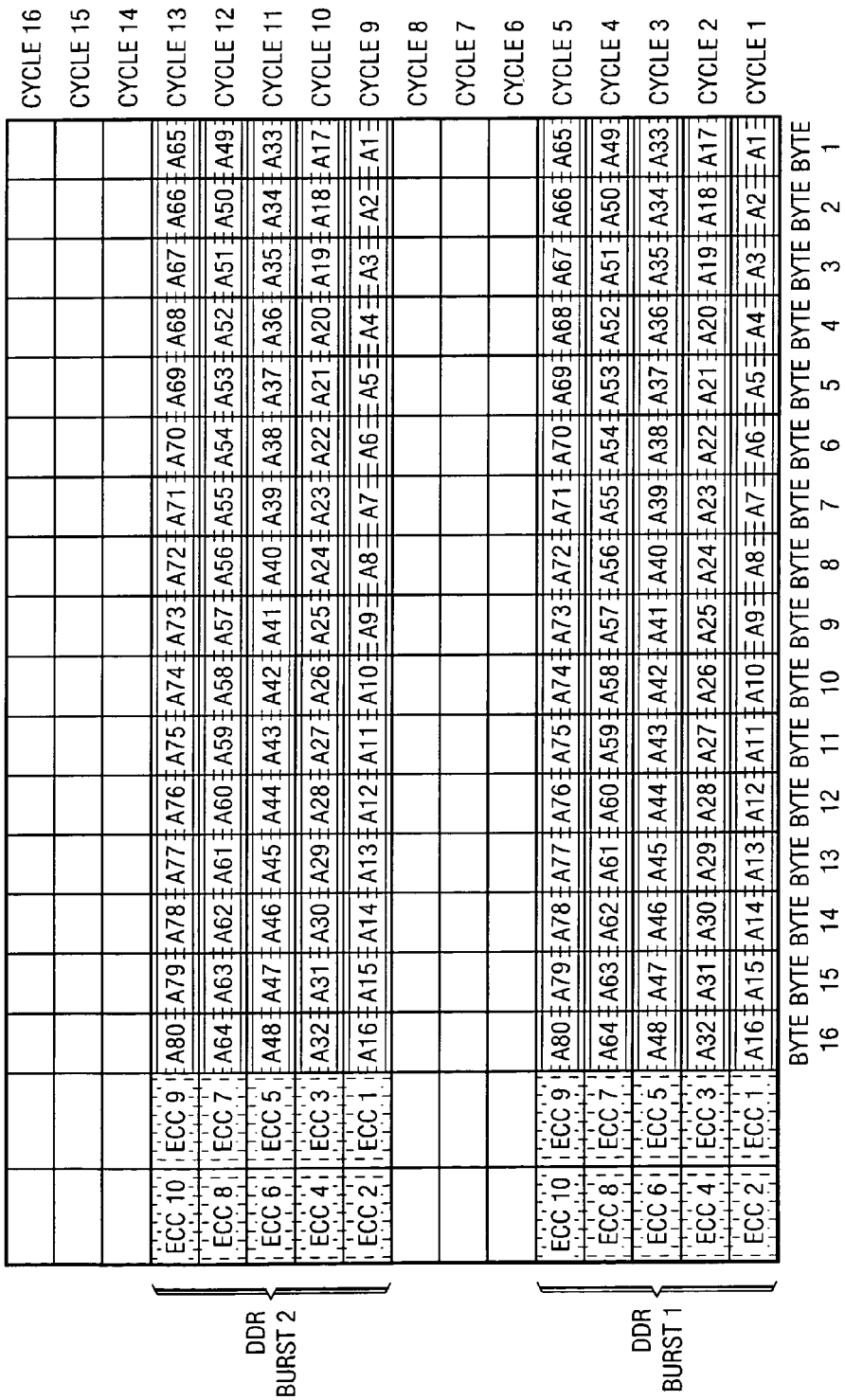
FIGS. 7 to 10 illustrate different embodiments of egress memories and respective writing sequences.

FIG. 7 shows typical writing sequences for such a memory. In this embodiment a 128 bit DDR SDRAM is used. Such a DDR SDRAM requires a burst length of 4 or 8 for maximum transmission speed. To be able to transfer one data cell, 80 bytes have to be stored. The data width of the memory interface for such a DDR SRAM memory is bidirectional and provides 144 bits. Thus, the memory can store 16 bytes in parallel, five cycles are needed to store a complete cell leaving 3 rows, each having 16 bytes unused. This embodiment also provides additional memory space, namely 2 bytes per memory row, for storing the error correction code. Thus additional pins and memory is required when implementing such a memory configuration. Other memory configurations and number of bytes to be transferred are contemplated herein and are within the scope of the invention.

Figure 8:
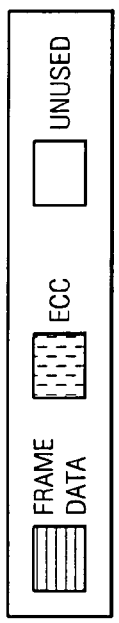

FIG. 8 shows a different example, using an in-band ECC memory scheme. With such a memory, the ECC bits are stored within normal memory space. Thus, the in-band ECC memory reduces the pin count and the number of memory devices that are needed. As shown in FIG. 7, the ECC code may be stored in the unused part of a memory transmission burst, namely in the 6th row of each burst transmission which usually contains no data.

Figure 9:
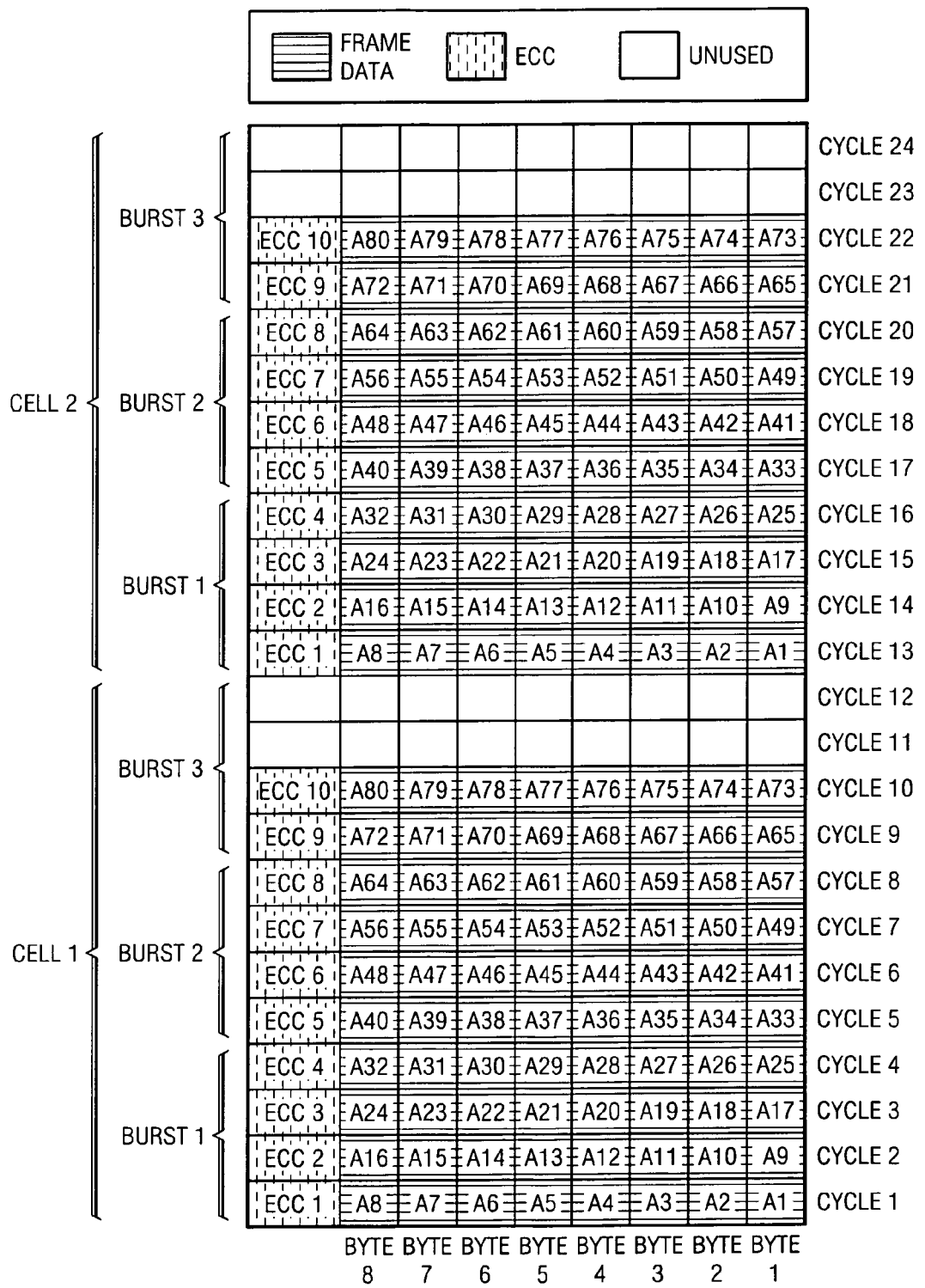
Figure 10:
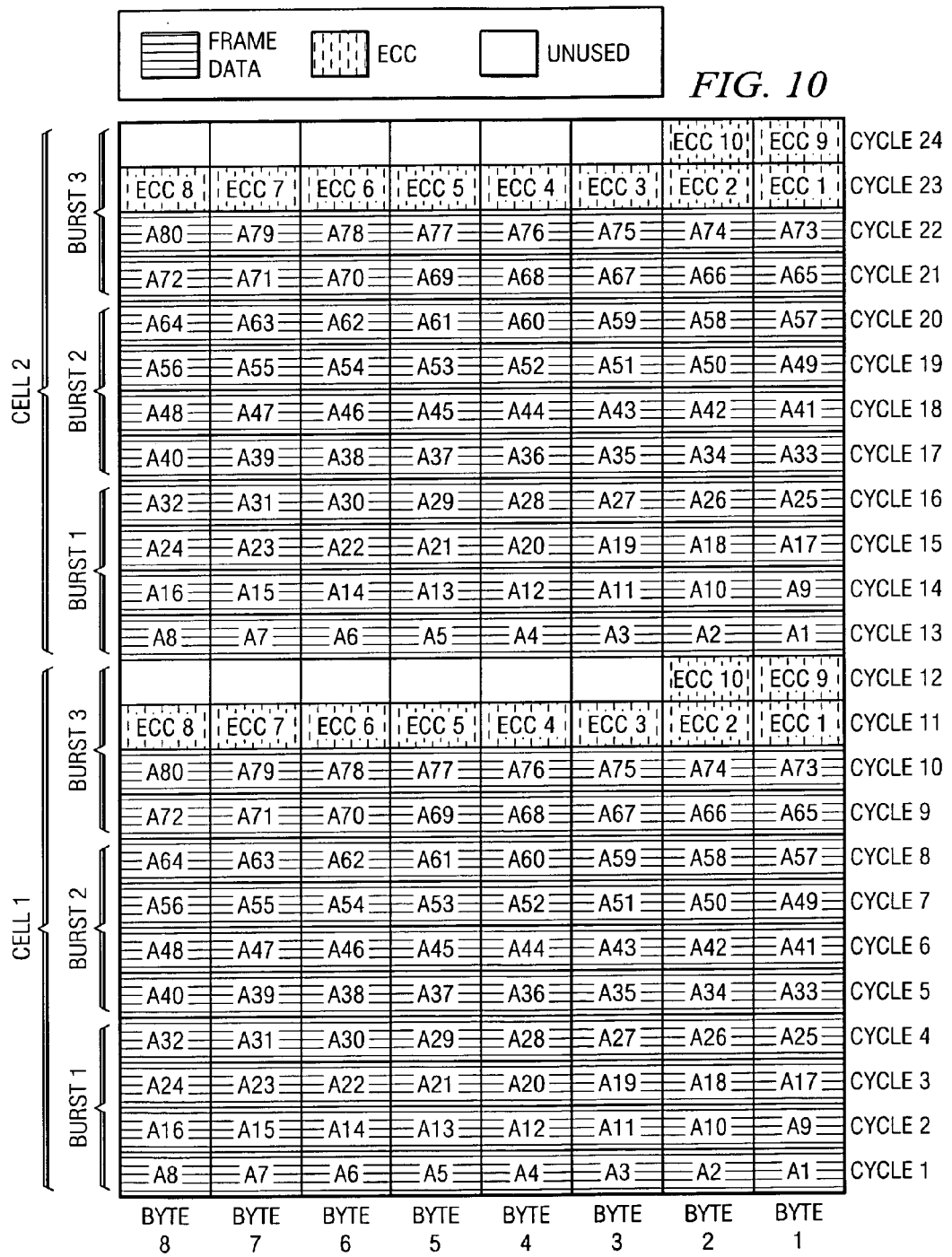

For QDR SRAM, the 128-bit memory interface will be separated into a 64-bit write memory interface and a 64-bit read memory interface. With a 64-bit read/write memory interface, ten data transfers are required per 640-bit cell. The QDR SRAM requires a burst length of 2. Such an embodiment is shown in FIG. 9 for a dedicated ECC QDR SRAM having additional memory for the error correction code and in FIG. 10 for an in-band ECC QDR SRAM. Quad data rate memories operate with 12 cycles per burst. Since ten cycles are needed to store a data cell, two memory rows will be left unused. The in-band ECC QDR SRAM takes a advantages of these two memory rows by using 10 bytes for the error correction code and only leaving 6 bytes unused. Thus, a more economical usage of the external memory may be provided.

The bridge may experience congestion because of the bandwidth differences between the CSIX interface 107 and the network processor interfaces 101 . . . 105. Therefore, the bridge 100 provides circuitry to monitor the depth of all queues, such as, for example, its egress queues 425*a–j*, which correspond to one of the egress ports. If the depth of one of the egress queues 425*a–j* reaches a high watermark, the bridge 100 generates a special congestion indication message. The bridge sends the special congestion indication message to the network processor 101, 102, 103, 104, or 105 that corresponds to the congested egress queue 425*a–j*. The receiving network processor 101, 102, 103, 104, or 105 will then use its normal XOFF Port-Level Flow Control mechanism for the congested port. When the congested bridge egress buffer depth reaches a low watermark, the bridge will generate a special message indicating that the congestion has cleared. The receiving network processor will once again use its Port-Level Flow Control scheme to re-start traffic to the port.

The bridge will track the congestion status of each of the egress buffers. The congestion status will be used to ensure that only a single congestion indication message is generated each time a threshold is reached. Once an egress buffer is marked as congested, the bridge will not generate any more congestion indication messages until the low watermark has been reached and a resume message has been sent. If an egress buffer is marked as uncongested, the bridge will not generate a resume message each time the low watermark is reached.

The bridge 100 can comprise parity error register as mentioned above for each of the interfaces using a parity control scheme. A parity register, thus, stores parity errors for all of the bridges interfaces. When a parity error occurs on one of the interfaces, the corresponding bit in the parity error register will be set. Each bit in the parity error register corresponds to one of the parity signals on the external interfaces. The parity error register is read and cleared with software through the host subsystem interface. Three configurable error output pins are provided to generate interrupts for errors. Upon receiving an interrupt, software can read status registers, such as the Parity Error Register, to learn about the error condition.

The bridge 100 permits some cells to be discarded. A special message type indicates whether or not a cell is discardable. The bridge 100 egress buffers have a programmable high watermark that indicates when to start discarding cells. If the depth of one of the egress buffers reaches the discard high watermark, all arriving cells destined to the congested egress buffer that are discardable are discarded. Cells are discarded until the egress buffer depth falls below a programmable low watermark.

Furthermore, other protocols such as ATM, SONET, InfiniBand may be used in addition to Ethernet and Fibre channel protocols. For example Quality of Service (QoS) protocols can be included as well. For example, the bridge may have multiple packets that are not discardable and are targeting the same egress port, the bridge then can use QoS or some other priority-based schemes to give preference to the packet that has the highest QoS or priority. Any other kind of priority based handling of data cells can be implemented. For example, highly prioritized data cells can be transported using the first egress path to avoid any kind of delay, thus circumventing the memory and additional queues.

The invention is not limited to five network processor interfaces. A bridge according to the present invention can comprise any number of network interfaces. Furthermore, additional interfaces having other protocols can be easily adapted and thus implemented within the bridge system according to the present invention.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A network system comprising:
    a plurality of network processor interfaces for transmitting and receiving data cell sequences,
    a switch fabric interface;
    an ingress path providing a plurality of ingress queues between the plurality of network processor interfaces and the switch fabric interface combining the transmitted data cells of the network processors to a single data cell sequence; and
    an egress path providing a plurality of egress queues and a memory controller between the plurality of the switch fabric interface and network processor interfaces for distributing data cell sequences from a received data cell sequence to the respective network processor interfaces, the egress path comprising a first egress path handling control signals and a second egress path handling data signals.

2. System according to claim 1, wherein each network processor interface comprises a receiving interface and a transmitting interface.

3. System according to claim 2, wherein the ingress queues each have an input and an output, each ingress queue input being coupled with a respective transmitting network processor interface, and the ingress path further comprises a multiplexer coupled with the outputs of the plurality of ingress queues and the switch fabric interface.

4. System according to claim 3, further comprising an ingress output queue coupled between the multiplexer and the switch fabric interface.

5. System according to claim 1, wherein the egress path comprises a de-multiplexer coupled with the switch fabric interface and the plurality of egress queues.

6. System according to claim 1, wherein said memory controller comprises a memory interface and a egress path routing switch routing the received cells through a memory coupled with the memory controller or directly to the network processor interfaces if no memory is coupled with the memory controller.

7. System according to claim 6, further comprising a first set of egress queues coupled between the de-multiplexer and a memory multiplexer coupled with a memory controller input, a memory de-multiplexer coupled with a memory controller output, a second set of egress queues coupled between the memory demultiplexer and the network processor interfaces.

8. System according to claim 7, wherein the egress path comprises a first egress path handling control signals and a second egress path handling data signals, wherein the first egress path comprises a third set of egress queues coupled between the de-multiplexer and the network processors and the second egress path comprises the first and second egress queues, and wherein a plurality of output multiplexers is coupled between the network processors and the first and second egress paths.

9. System according to claim 7, wherein the first and second set of egress queues comprises two queues associated with each network processor interface.

10. System according to claim 6, wherein the memory interface is configured to couple with an error correcting memory.

11. System according to claim 6, wherein the memory interface is configured to couple with a DDR SRAM.

12. System according to claim 10, wherein the memory interface is configured to couple with a QDR ECC SRAM.

13. System according to claim 10, wherein the error correcting memory is an inband memory.

14. System according to claim 1, wherein each queue comprises an associated watermark register.

15. System according to claim 14, further comprising a control unit for controlling the ingress and egress queues.

16. System according to claim 14, further comprising a host-subsystem interface coupled with the control unit.

17. System according to claim 1, wherein the network processor interface is provided on a line card having five network processor ports.

18. System according to claim 17, comprising a plurality of five network processor ports.

19. System according to claim 1, wherein the switch fabric interface has a higher bandwidth than one of the plurality of network processor interfaces and the number of network processors interfaces is adapted to approximately match the bandwidth of the bandwidth of the switch fabric interface.

20. A method of controlling the ingress and egress data paths of a network processor interface system, said method comprising the steps of:
   providing a plurality of network processor interfaces for transmitting and receiving data cell sequences,
   providing a switch fabric interface;
   providing an ingress path having a plurality of ingress queues between the plurality of network processor interfaces and the switch fabric interface combining the transmitted data calls of the network processors to a single data cell sequence;
   providing an egress path having a plurality of egress queues and a memory controller between the plurality of the switch fabric interface and network processor interfaces for distributing data cell sequences from a received data cell sequence to the respective network processor interfaces; and
   splitting the egress path into a first path handling control data cells and a second path handling data cells.

21. Method according to claim 20, further comprising the steps of:
   buffering transmitted data cells in the ingress queues,
   combining the content of the ingress queues, and
   buffering the combined data cells in an ingress output queue.

22. Method according to claim 20, further comprising the step of:
   if a memory is coupled to the memory interface, storing received data cells in the memory,
   otherwise moving the received data cells directly to the respective network processor interface.

23. Method according to claim 20, further comprising the steps of:
   providing at least two egress queues for each network processor interface, and
   selecting which queue is coupled with the associated network processor interface.

24. Method according to claim 22, further comprising the steps of:
   generating a control data cell by the memory controller, and
   routing the generated control cell through the first egress path.

25. Method according to claim 20, further comprising the steps of:
   monitoring the filling level of the queues, and
   generating control signals according to the filling level.

26. Method according to claim 25, further comprising the step of:
   discarding data cells according to their status if the filling level is reached within a queue.

27. Method according to claim 20, further comprising the step of:
   distributing data cells according to a priority scheme included in the data cells.

28. Method according to claim 20, further comprising:
   distributing data cells according to a Quality of Service scheme included in the data cells.

29. Method according to claim 20, wherein storage area network and networking protocols are processed.

30. Method according to claim 20, wherein the switch fabric interface has a higher bandwidth than one of the plurality of network processor interfaces, and the method further comprises the step of providing a number of network processor interfaces adapted for combining the bandwidth of the network processors to approximately match the bandwidth of the switch fabric interface.

31. Method according to claim 30, wherein the bandwidth of the switch fabric interface is lower than the combined bandwidth of the network processor interfaces.

* * * * *